(12) United States Patent  
Gatton

(10) Patent No.: US 9,952,044 B2  
(45) Date of Patent: Apr. 24, 2018

(54) MULTI-AXIS CALIBRATION BLOCK

(71) Applicant: Rolls-Royce North American Technologies, Inc., Indianapolis, IN (US)

(72) Inventor: Geoffrey L. Gatton, Brownsburg, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 82 days.

(21) Appl. No.: 15/012,631

(22) Filed: Feb. 1, 2016

(65) Prior Publication Data

US 2016/0223325 A1    Aug. 4, 2016

Related U.S. Application Data

(60) Provisional application No. 62/110,776, filed on Feb. 2, 2015.

(51) Int. Cl.
*G01B 21/04* (2006.01)
*G01B 3/30* (2006.01)

(52) U.S. Cl.
CPC .............. *G01B 21/042* (2013.01); *G01B 3/30* (2013.01)

(58) Field of Classification Search
CPC ...... G01B 21/042; G01B 21/045; G01B 5/20; G01B 7/008; G01B 7/28
See application file for complete search history.

(56) References Cited

U.S. PATENT DOCUMENTS

| 3,908,278 A | * | 9/1975 | Sundahl | G01B 3/30 |
| | | | | 33/502 |
| 3,908,439 A | | 9/1975 | Pelak et al. | |
| 4,068,524 A | | 1/1978 | Lewis et al. | |
| 4,142,296 A | | 3/1979 | Miller | |
| 4,364,182 A | * | 12/1982 | Jones | G01B 3/30 |
| | | | | 33/567 |
| 4,435,905 A | | 3/1984 | Bryan | |
| 4,523,450 A | * | 6/1985 | Herzog | G01B 3/30 |
| | | | | 33/502 |
| 4,763,507 A | * | 8/1988 | Zofchak | G01B 21/042 |
| | | | | 33/502 |

(Continued)

FOREIGN PATENT DOCUMENTS

DE    29822001 U1    3/1999
DE    10222575 A1    11/2003

(Continued)

OTHER PUBLICATIONS

European Search Report from corresponding European Application No. 16153611.5, dated Mar. 14, 2016, 7 pp.

(Continued)

*Primary Examiner* — David A Rogers
(74) *Attorney, Agent, or Firm* — Shumaker & Sieffert P.A.

(57) ABSTRACT

A calibration block for calibrating a touch probe includes a calibration block body forming a bored hole providing a concave measurement surface, and a three dimensional object protruding from the calibration block body and providing a convex measurement surface, wherein the convex measurement surface provides opposing measurement contact points in at least two dimensions.

15 Claims, 5 Drawing Sheets

(56) References Cited

U.S. PATENT DOCUMENTS

| | | | | |
|---|---|---|---|---|
| 4,962,591 A * | 10/1990 | Zeller | G01B 21/042 | 33/502 |
| 5,125,261 A * | 6/1992 | Powley | G01B 21/042 | 33/502 |
| 5,134,781 A * | 8/1992 | Baker | G01B 21/042 | 33/502 |
| 5,269,067 A * | 12/1993 | Waeldele | G01B 3/30 | 33/502 |
| 5,313,410 A * | 5/1994 | Watts | G01B 21/042 | 33/503 |
| 5,501,096 A * | 3/1996 | Stettner | G01B 21/042 | 33/503 |
| 5,583,443 A * | 12/1996 | McMurtry | G01B 7/008 | 324/601 |
| 5,665,896 A * | 9/1997 | McMurtry | G01B 21/042 | 73/1.75 |
| 5,687,293 A * | 11/1997 | Snell | B25J 9/1692 | 318/568.13 |
| 5,813,128 A * | 9/1998 | Bailey | G01B 21/042 | 33/502 |
| 6,023,850 A * | 2/2000 | Trapet | G01B 21/042 | 33/502 |
| 6,415,644 B1 | 7/2002 | Rockwood et al. | | |
| 6,434,846 B1 * | 8/2002 | McMurtry | G01B 21/042 | 33/502 |
| 6,493,956 B1 * | 12/2002 | Matsuda | G01B 21/042 | 33/502 |
| 6,513,253 B2 * | 2/2003 | Matsuda | G01B 21/042 | 33/502 |
| 6,557,429 B1 * | 5/2003 | Asquith | B66C 1/04 | 335/212 |
| 6,591,208 B2 * | 7/2003 | Lotze | G01B 21/045 | 702/152 |
| 6,594,532 B2 | 7/2003 | Mills | | |
| 6,782,730 B2 * | 8/2004 | Asanuma | G01B 21/042 | 73/1.79 |
| 6,854,777 B2 * | 2/2005 | Jung | B66C 1/04 | 294/65.5 |
| 7,036,236 B1 * | 5/2006 | Drescher | G01C 25/00 | 33/502 |
| 7,055,367 B2 * | 6/2006 | Hajdukiewicz | G01B 21/042 | 33/501.02 |
| 7,100,297 B2 * | 9/2006 | McMurtry | G01B 7/012 | 33/556 |
| D536,152 S * | 1/2007 | Yamaki | D34/28 | |
| 7,174,652 B2 * | 2/2007 | McMurtry | B23Q 1/5462 | 33/558.2 |
| 7,464,579 B2 | 12/2008 | Orchard | | |
| 7,548,147 B2 * | 6/2009 | Chiang | H01F 7/0257 | 335/285 |
| 7,568,373 B2 * | 8/2009 | McMurtry | G01B 3/30 | 73/1.81 |
| D601,910 S * | 10/2009 | Ziggiotti | D10/46 | |
| 7,797,128 B2 | 9/2010 | Ashford et al. | | |
| 7,866,056 B2 * | 1/2011 | Ould | G01B 21/042 | 33/503 |
| 7,869,026 B2 * | 1/2011 | Boyer | G01B 21/042 | 356/243.1 |
| 7,900,367 B2 * | 3/2011 | Sutherland | G01B 21/042 | 33/502 |
| 7,905,027 B2 * | 3/2011 | MacManus | G01B 21/10 | 33/502 |
| 7,913,537 B2 * | 3/2011 | Petterson | G01B 21/042 | 33/502 |
| 8,055,466 B2 * | 11/2011 | Bryll | G01B 21/042 | 702/85 |
| 8,296,098 B2 * | 10/2012 | Mills | G01B 5/20 | 33/553 |
| 8,336,219 B2 | 12/2012 | Grzesiak et al. | | |
| 8,494,800 B2 * | 7/2013 | Matsushita | B23Q 17/22 | 702/95 |
| 8,624,604 B2 | 1/2014 | Heyworth et al. | | |
| 8,702,079 B2 * | 4/2014 | Sladojevic | B25B 11/002 | 249/40 |
| 8,756,973 B2 | 6/2014 | Wallace et al. | | |
| 8,875,603 B2 * | 11/2014 | Maxted | G05B 19/401 | 82/1.11 |
| 8,939,008 B2 * | 1/2015 | McMurtry | G01B 3/30 | 73/1.75 |
| 9,003,670 B2 * | 4/2015 | Romanelli | G01B 5/008 | 33/502 |
| 2003/0106229 A1 * | 6/2003 | Jordil | G01B 21/042 | 33/502 |
| 2004/0244464 A1 * | 12/2004 | Hajdukiewicz | G01B 21/042 | 73/1.79 |
| 2004/0263302 A1 * | 12/2004 | Yamaki | H01F 7/0294 | 335/306 |
| 2005/0066534 A1 | 3/2005 | Matsuda | | |
| 2005/0092091 A1 | 5/2005 | Greelish | | |
| 2006/0235636 A1 * | 10/2006 | Madlener | G05B 19/401 | 702/95 |
| 2008/0234963 A1 * | 9/2008 | Scott | G01B 21/042 | 702/86 |
| 2009/0094847 A1 | 4/2009 | Clifford | | |
| 2011/0040523 A1 * | 2/2011 | Matsushita | B23Q 17/22 | 702/152 |
| 2016/0116275 A1 * | 4/2016 | Matsushita | G01B 21/042 | 702/95 |

FOREIGN PATENT DOCUMENTS

| | | |
|---|---|---|
| WO | 0042387 A1 | 7/2000 |
| WO | 2005028996 A1 | 3/2005 |
| WO | 2014135721 A1 | 9/2014 |

OTHER PUBLICATIONS

Response to Search Opinion dated Mar. 14, 2016, from counterpart European Application No. 16153611.5, filed Jan. 26, 2017, 8 pp.

* cited by examiner

MULTI-AXIS CALIBRATION BLOCK

This application claims the benefit of U.S. Provisional Application No. 62/110,776, filed Feb. 2, 2015, the entire content of which is incorporated herein by reference.

TECHNICAL FIELD

The invention relates to calibration blocks, and more particularly, but without limitation, to calibration blocks facilitating multi-axis calibration of touch probes.

BACKGROUND

Touch probes are commonly used to investigate the properties of machined components. A known method of calibrating such probes for measurements is to mount a block of material with one or more bored holes to a measurement table associated with a mechanical holding arm and the touch probe. The hole diameter and hole depth may vary between the holes in order to provide a range of calibration features. Depth and diameter measurements of the holes may be first measured manually with a calipers to provide reference demensions for the touch probe.

When using a touch probe to investigate a component, the touch probe is supported by the mechanical holding arm, allowing measurements to be taken at various points on the surface of the component. The position of the holding arm can be controlled using appropriate software, and the arm may be indexed to various positions within a three dimensional coordinate space, including a nominal origin of that space. The same mechanical arm is typically used to support several different probes during examination of a single component. For example, a touch probe may be used in conjunction with an ultrasonic thickness probe in order to map a component.

To calibrate the touch probe, the touch probe is used to measure the depth and or diameter of the holes. The measured depths and or diameters values are then compared to established reference demensions, obtained using a different method, such as a calipers, in order to calibrate the touch probe. Calibration using the block with bored holes may be repeated using any number of different probes.

Following the calibration procedure, the block with bored holes is removed from the measurement table and a component to be measured is secured to the measurement table for examination. Using the calibration information various dimensions of the component may be measured using the touch probe supported by the mechanical holding arm.

SUMMARY

This disclosure is directed to techniques for calibration of a probe mounted to a multi-axis mechanical holding arm. The disclosed techniques include a calibration block with a bored hole providing a concave measurement surface as well as a three dimensional object providing a convex measurement surface. In one specific example, the three dimensional object may be a sphere. The calibration block may be mounted on a magentic base that allows the calibration block to be secured to a measurement table without using separate fixtures of the measurement table. In such examples the calibration block may remain mounted to the measurement table even when a component to be measured is secured to the measurement table for analysis. In this manner, calibration may be repeated before, during, and after measurements of the component are performed without moving the component. This may improve accuracy of component measurements compared to alternative techniques in which a calibration block cannot be colocated on the measurement table in combination with a component to be measured. Disclsoed techniques further include software, computer systems and methods for performing calibration procedures using a calibration block.

In one example, this disclosure is directed to a calibration block for calibrating a touch probe. The calibration block comprises a calibration block body forming a bored hole providing a concave measurement surface, and a three dimensional object protruding from the calibration block body and providing a convex measurement surface. The convex measurement surface provides opposing measurement contact points in at least two dimensions.

In another example, this disclosure is directed to a method of calibrating a touch probe comprising locating a touch probe relative to a calibration block. The calibration block includes a calibration block body forming a bored hole providing a concave measurement surface, and a three dimensional object protruding from the calibration block body and providing a convex measurement surface. The convex measurement surface provides opposing measurement contact points in at least two dimensions. The method further comprises measuring the three dimensional object with a distal tip of the touch probe by manipluating the touch probe with a five-axis mechanical holding arm and contacting multiple points of the three dimensional object. Measuring the bored hole with sides of the distal tip of the touch probe by manipluating the touch probe with a five-axis mechanical holding arm and contacting multiple points of the concave measurement surface. Comparing the sizes of the three dimensional object and the bored hole as measured by manipluating the touch probe with the five-axis mechanical holding arm with predefined actual sizes of the three dimensional object and the bored hole to generate calibration factors for the touch probe. Storing the calibration factors for the touch probe in a non-tansitory computer readable medium.

In a further example, this disclosure is directed to a system for measuring features of a component, the system comprising a calibration block including a calibration block body forming a bored hole providing a concave measurement surface, and a three dimensional object protruding from the calibration block body and providing a convex measurement surface. The convex measurement surface provides opposing measurement contact points in at least two dimensions. The system further comprises a measurement table, five-axis mechanical holding arm configured to manipulate a touch probe to measure the calibration block and the component, and a computing device. The computing device is configured to send control signals to the five-axis mechanical holding arm to locate the touch probe mounted in the five-axis mechanical holding arm relative to the calibration block, send control signals to the five-axis mechanical holding arm to measure the three dimensional object with a distal tip of the touch probe by contacting multiple points of the three dimensional object, send control signals to the five-axis mechanical holding arm to measure the bored hole with sides of the distal tip of the touch probe by contacting multiple points of the concave measurement surface, generate calibration factors for the touch probe by comparing the sizes of the three dimensional object and the bored hole as measured by manipluating the touch probe with the five-axis mechanical holding arm with predefined actual sizes of the three dimensional object and the bored hole, and store the calibration factors for the touch probe in a non-tansitory computer readable medium.

In another example, this disclosure is directed to a non-transitory computer-readable data storage medium having instructions stored thereon that, when executed by one or more processors of a computing device, cause the computing device to send control signals to a five-axis mechanical holding arm to locate a touch probe mounted in the five-axis mechanical holding arm relative to a calibration block. The calibration block includes a calibration block body forming a bored hole providing a concave measurement surface, and a three dimensional object protruding from the calibration block body and providing a convex measurement surface, wherein the convex measurement surface provides opposing measurement contact points in at least two dimensions. The instructions further cause the computing device to send control signals to the five-axis mechanical holding arm to measure the three dimensional object with a distal tip of the touch probe by contacting multiple points of the three dimensional object, send control signals to the five-axis mechanical holding arm to measure the bored hole with sides of the distal tip of the touch probe by contacting multiple points of the concave measurement surface, generate calibration factors for the touch probe by comparing the sizes of the three dimensional object and the bored hole as measured by manipluating the touch probe with the five-axis mechanical holding arm with predefined actual sizes of the three dimensional object and the bored hole, and store the calibration factors for the touch probe in a non-tansitory computer readable medium.

The details of one or more examples of this disclosure are set forth in the accompanying drawings and the description below. Other features, objects, and advantages of this disclosure will be apparent from the description and drawings, and from the claims.

DETAILED DESCRIPTION

Figure 1A:
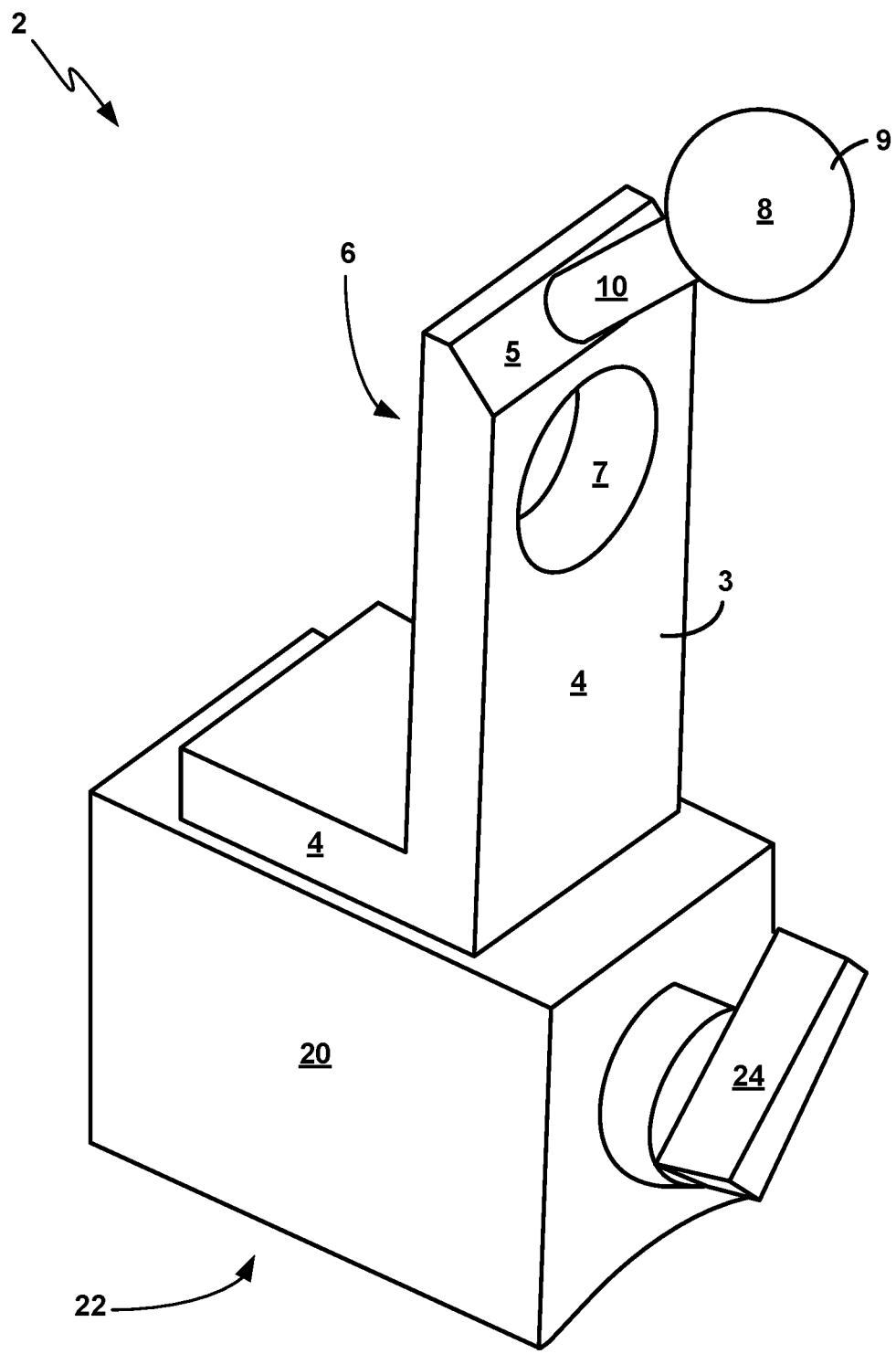
FIGS. 1A-1C illustrate a calibration block for calibrating a touch probe in accordance with an example of this disclosure.
Figure 1C:
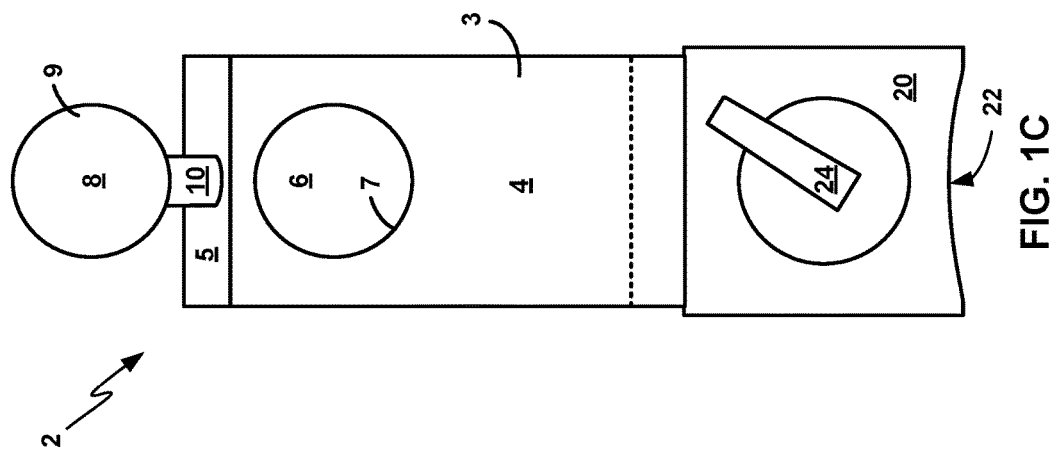
Figure 1B:
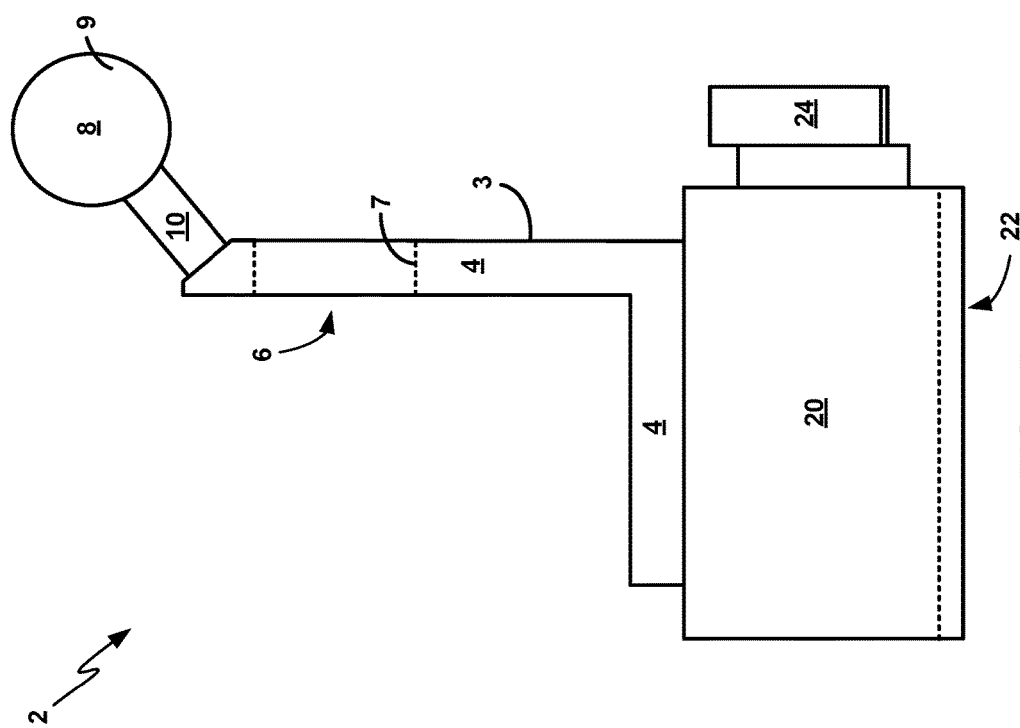

FIGS. 1A-1C illustrate calibration block 2, suitable for use in calibrating a touch probe. Specifically, FIG. 1A illustrates a perspective view of calibration block 2, FIG. 1B illustrates a side view of calibration block 2, and FIG. 1C illustrates a front view of calibration block 2. Calibration block 2 includes calibration block body 4 forming flat measurement surface 3 and bored hole 6. Bored hole 6 provides concave measurement surface 7 for calibration of the touch probe. In addition, calibration 2 further includes sphere 8 with convex measurement surface 9. The combination of bored hole 6 and sphere 8 facilitates all axis certification and surveillance auditing of machine tool measurement systems such as system 100 of FIG. 2.

Calibration block 2 further includes magnetic base 20. Magnetic base 20 includes bottom magnetic mounting surface 22, which includes one or more permanent magnets that secure calibration block 2 to a measurement table associated with a mechanical holding arm and the touch probe. The configuration of calibration block 2 with magnetic base 20 allows calibration block 2 to facilitate calibration of the touch probe without disturbing a component positioned on the measurement table. Magnetic base 20 further includes an optional manual release mechanism 24. Manual release mechanism 24 includes a lever mechanism. When rotated, the level facilitates releasing mangnetic base 20 from a measurement table by pressing down on the measurement table to force separation between the measurement table and magnetic base 20. Without manual release mechanism 24, it may be difficult to manually remove calibration block 2 from a metal measurement table due to the magnetic holding force of the permanent magnet(s) of bottom magnetic mounting surface 22.

Note that the design and configuration of magnetic base 20 provides portability and adjustability for the poistioning of calibration block 2. However, magnetic base 20 merely represents one particular example of mounting techniques for calibration block 2, and that other techniques may be used within the spirit of this disclosure. For example, calibration block 2 may be a permanent fixture relative to a measurement table or removeable as with examples including mangnetic base 20. In the same or different examples, calibration block 2 may be mounted proximate a measurement table using bolts, screws, clamps, active or passive suction or by any other suitable techniques.

As previously mentioned, calibration block body 4 forms bored hole 6, which provides concave measurement surface 7 for calibration of the touch probe. Bored hole 6 at least approximates a cylindrical shape such that concave measurement surface 7 at least approximates a ring shape, although a precise ring shape may be particularly useful for calibration of the touch probe as the offset of one side of a sphere to the other about convex measurement surface 9 is constant for any direction within the plane normal to flat measurement surface 3. For example, calibration using bored hole 6 may include contacting flat measurement surface 3 at multiple points with the touch probe to determine the orientation of calibration block body 4 and bored hole 6. Thus, the configuration of calibration block body 4, bored hole 6 and concave measurement surface 7 provides opposing measurement contact points in the two dimensions normal to flat measurement surface 3. Example dimensions include up-down and left-right relative to flat measurement surface 3.

In other examples, bored hole 6 may provide a different shape, rather than a cylindrial shape and still provide a useful concave measurement surface. However, such alterative shapes may require determining the orintation of calibration block 2 in all dimensions rather than just the two dimensions that can be determined by contacting flat measurement surface 3 with the touch probe.

Sphere 8 is mounted calibration block body 4 via mounting rod 10, which protudes at an normal angle from beveled surface 5 of calibration block body 4 such that sphere is located above the height of calibration block body 4. Sphere 8 at least approximates a sphere, although a precise spherical shape may be particularly useful for calibration of the touch probe as the offset of one side of a sphere to the other about convex measurement surface 9 is constant for any dimension, such that the relative positions of opposing surfaces facilitate calibration independent of the orientation of calibration block 2 and sphere 8, and independent of the calibration of the orientation of a coordinate system for the touch probe and associated mechanical holding arm. The configuration of mounting rod 10, sphere 8 and convex measurement surface 9 provides opposing measurement contact points in three dimensions to faciltate five-axis calibration of the touch probe. Example dimensions include up-down, forward-backward, and left-right relative to the measurement table associated with a mechanical holding arm and the touch probe.

In other examples, a different three dimensional object, rather than sphere 8 may protrude from calibration block body 4 and provide a convex measurement surface. However, such alterative shapes to sphere 8 should still provide opposing measurement contact points in at least two dimensions and may require determing the orientation of the calibration block, e.g., by contacting flat measurement surface 3 with the touch probe, to facilitate calibration using the three dimensional object. One such alernative shape is a cylindar.

Figure 2:
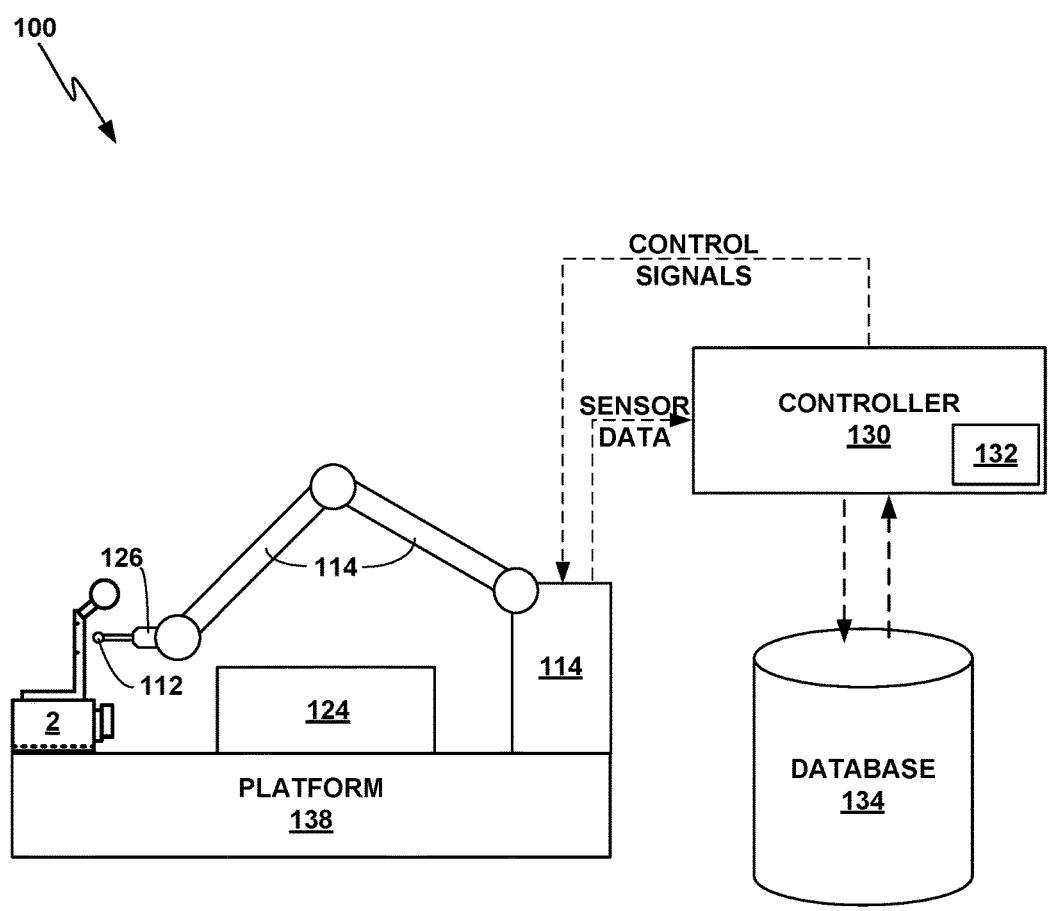
FIG. 2 illustrates a system including a measurement table, a five-axis mechanical holding arm configured to manipulate a touch probe, a calibration block and a computing device configured to measure component secured to the measurement table based on calibration factors from measurement of the calibration block.

FIG. 2 illustrates system 100. System 100 includes five-axis mechanical holding arm 114, controller 130 and database 134. Touch probe 112 is secured within chuck 126 of mechanical holding arm 114. Five-axis mechanical holding arm 114 allows computer controlled positioning and rotation of touch probe 112 with chuck to facilitate measurements of component 124, which is mounted to platform 138. Touch probe 112 is multidirectional in that the tip of touch probe 112 includes multi-direction contact surface area. Other touch probes may have a pointed tip, and system 100 may be configured to use multiple touch probes of different configurations.

Platform 138 serves as a measurement table for five-axis mechanical holding arm 114. In addition to component 124, calibration block 2, as described with respect to FIG. 1, is mechanically secured to platform 138 to facilitate calibration of mechanical holding arm 114 and touch probe 112. In particular, mechanical holding arm 114 and controller 130 sense contact between touch probe 112 and an object, such as calibration block 2 and component 124. Mechanical holding arm 114 and controller 130 further provide a precise control and positioning system to facilitate precision measurements of an object based on multiple points of contact between touch probe 112 and the object.

As shown in FIG. 2, component 124 is mounted to platform 138 to facilitate measurement of surfaces, such as machined surfaces of component 124 with touch probe 112. In some examples, component 124 may remain secured to platform 124 during a machining operation. In other examples, component 124 may be machined at a separate workstation.

Controller 130 represents a computing device configured to operate five-axis mechanical holding arm 114 to calibrate touch probe 112 and measure component 124 based on calibration factors from measurement of calibration block 2. In some particular examples, controller 130 may include multiple computing devices that combine to provide the functionality of controller 130 as described herein. For example, controller 130 may comprise a CNC controller that issues instructions to chuck 126 and positioning actuators of chuck 126 as well as a separate computing device that interacts with database 134 to store and retrieve control programs, calibration and/or measurement data. In some examples, such a computing device may represent a general purpose computer running software.

Controller 130 determines various dimensions of component 124 based on measurements according by touch probe 112. Controller 130 may be connected to database 134, which includes a non-transitory computer-readable medium storing control programs, calibration and/or measurement data.

Figure 4:
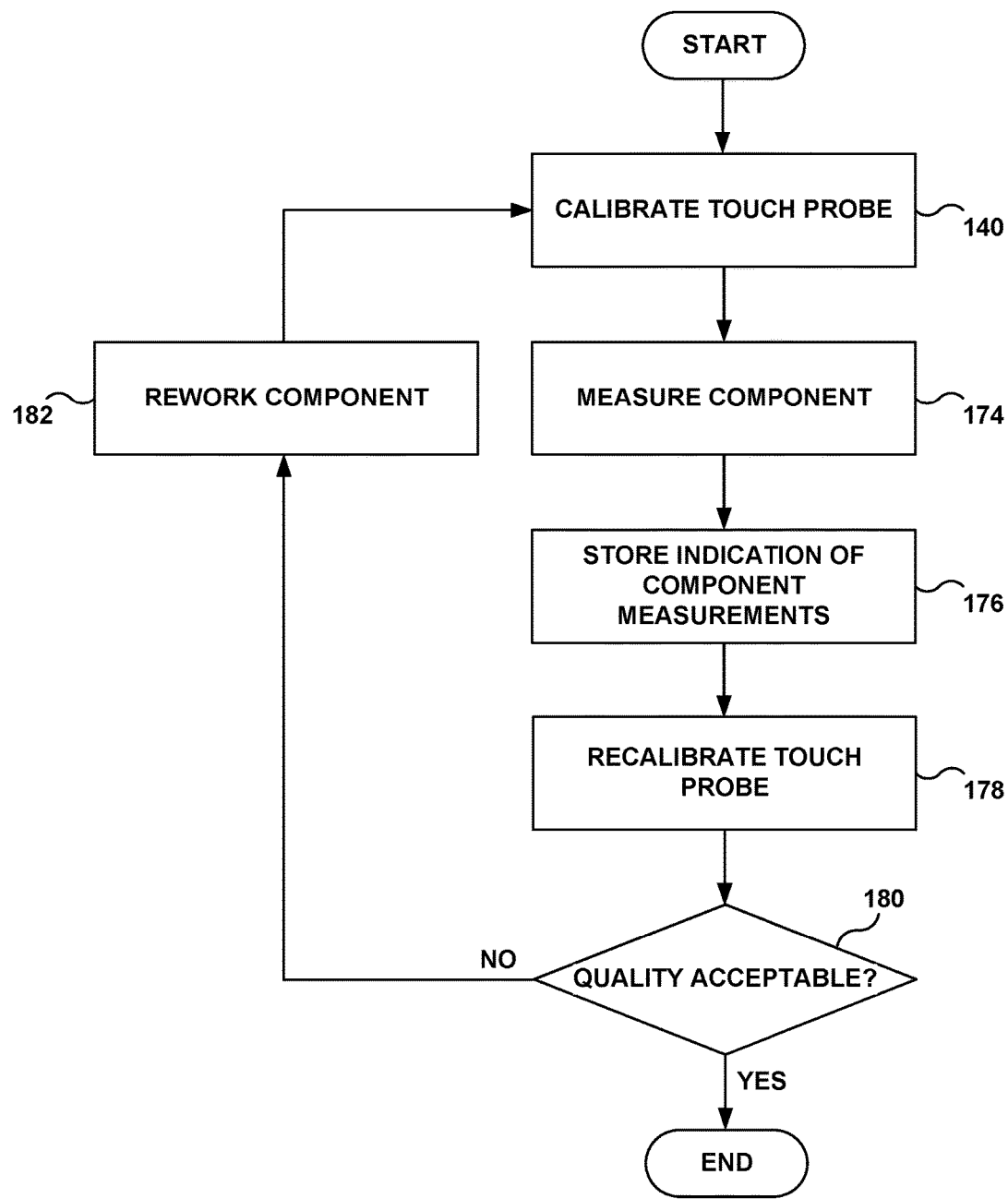
FIG. 4 is a flowchart illustrating example techniques for measuring a component using the system of FIG. 2 including calibration according to the techniques of FIG. 3.

As discussed in further detail with respect to FIG. 4, controller 130 may flag component 124 or a particular feature thereof when a measurement is outside of specifications for further evaluation and/or a secondary rework. In some examples, a machined feature may be automatically subjected to a secondary rework operation before component 124 is removed from platform 138.

Figure 3:
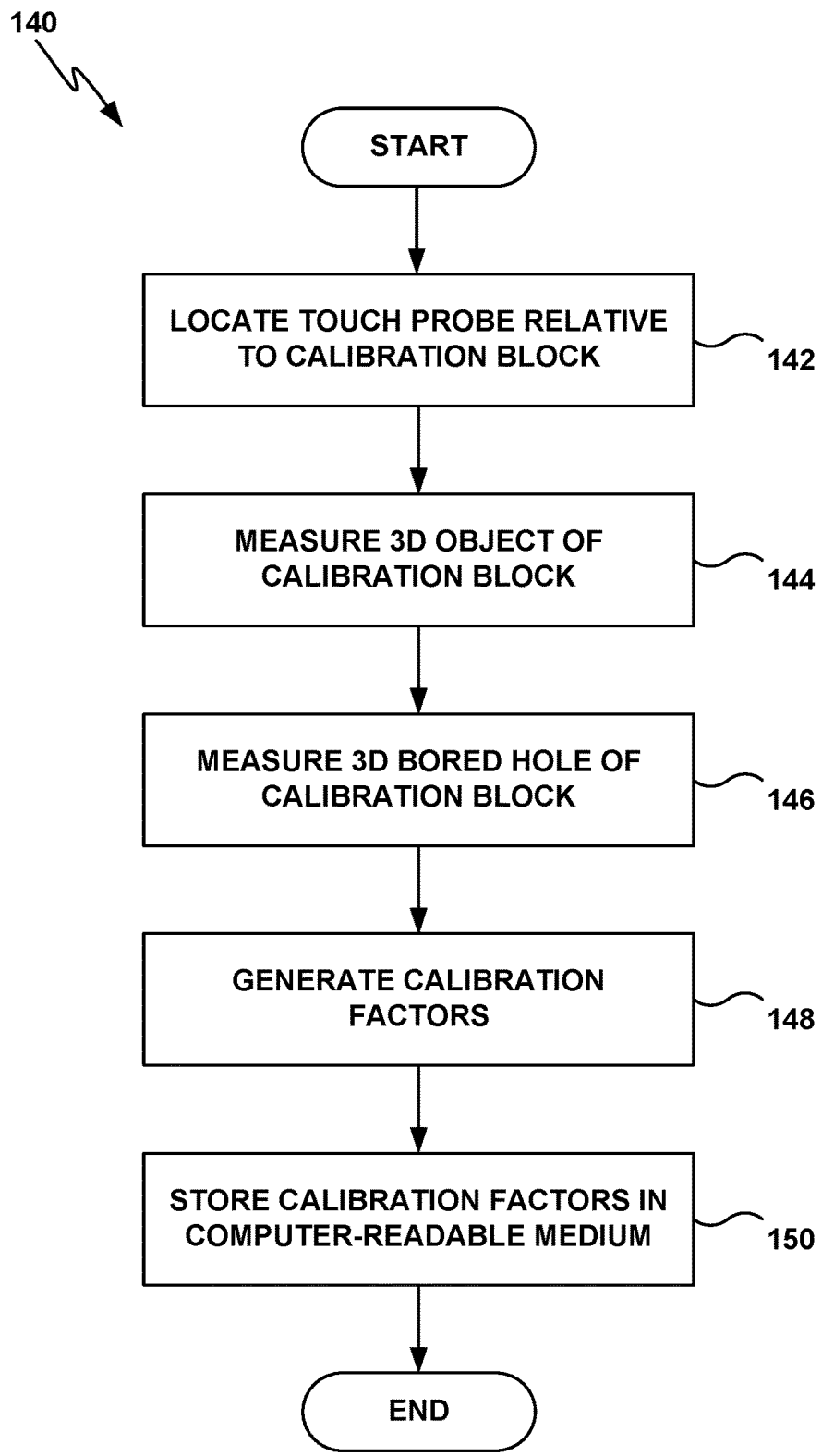
FIG. 3 is a flowchart illustrating example techniques for calibrating the system of FIG. 2.

FIG. 3 is a flowchart illustrating example techniques 140 for calibrating system 100 of FIG. 2. Calibration block 2 and, optionally, component 124 are mounted to platform 138. For example, calibration block 2 may be mounted to platform 138 with magnetic base 20. Controller 130 instructs mechanical arm 114 to locate touch probe 112 relative to calibration block 2 (142). For example, controller 130 may use touch probe 112 to find a surface, such as surface 3, of calibration block body 4 to determine a preliminary position of calibration block 2 relative to platform 138 and mechanical arm 114. In some examples, locating touch probe 112 relative to calibration block 2 may further include mounting touch probe 112 in mechanical arm 114, either manually or automatically. For example, touch probe 112 may be picked up from a tray holding numerous tools for mechanical arm 114, which may include multiple touch probes of varying sizes and configurations, and or machining elements such as drill bits, routing bits, grinding elements, sanding elements, polishing elements or other equipment. In this manner, mechanical arm 114 may serve as a multipurpose robotic arm in addition to facilitating measurements of calibration block 2 and component 124.

Controller 130 takes multiple measurements of various elements of calibration block 2 to calibrate mechanical arm 114 and touch probe 112 in a multitude of directions and dimensions. In one aspect, controller 130 may measure sphere 8 of calibration block 2 by contacting multiple points of sphere 8 with touch probe 112 (144). In some examples, controller 130 may measure sphere 8 by contacting at least six points of sphere 8 with a distal tip of touch probe 112. The six points may each be at different angular positions about sphere 8 to measure the diameter of sphere 8. In one particular example, the six points may represent opposing contact points in three different dimensions about sphere 8. In another aspect, controller 130 may measure bored hole 6 of calibration block 2 by contacting multiple points of bored hole 6 with touch probe 112 (146). In some examples, controller 130 may measure bored hole 6 by contacting at least three points of bored hole 6 by with the sides of the distal tip of touch probe 112 to measure the diameter of bored hole 6.

Controller 130 generates calibration factors in multiple dimensions for mechanical arm 114 and touch probe 112 (148). In some examples, generation of the calibration factors may include comparing discrete measurements taken of various elements of calibration block 2 with predefined actual sizes of various elements of calibration block 2. Controller 130 stores the calibration factors in a in a non-tansitory computer readable medium, such as database 134 for use when measuring a component on platform 138, such as component 124 (150).

In some examples, the predefined actual sizes of various elements of calibration block 2 may represent user input of the predefined actual sizes into user interface 132 of controller 130. A user may make manual measurements of the predefined actual sizes, e.g., using calipers or other precise measurement tool, to determine the predefined actual sizes for input into user interface 132. In the example of calibration block 2, a user may input, for example, measurements representing the diameters of sphere 8 and bored hole 6.

FIG. 4 is a flowchart illustrating example techniques for measuring a component using the system of FIG. 2 including calibration according to the techniques of FIG. 3. With calibration block 2 and component 124 mounted to platform 138, and controller 130 calibrates mechanical arm 114 and touch probe 112 as described with respect to FIG. 3 (140).

With component 124 mounted to platform 138, and controller 130 initiates a measurement of component 124 by manipulating touch probe 112 with mechanical arm 114 (174). Controller 130 stores values of the measured features of component 124 in database 134 (176). In some examples, the stored values of the measured features of component 124 may be based on the calibration factors from measurements of calibration block 2 calculated during step 140.

In some examples, controller may recalibrate touch probe 112 following the measurement of features of component 124 (178). For example, controller 130 may take multiple measurements of various elements of calibration block 2 to calibrate mechanical arm 114 and touch probe 112 in a multitude of directions and dimensions. Controller 130 may compare the sizes of sphere 8 and bored hole 6 as measured by manipluating touch probe 112 with holding arm 114 with the predefined actual sizes of sphere 8 and bored hole 6 to generate updated calibration factors for touch probe 112. Controller 130 may store the updated calibration factors for touch probe 112 in database 134, and in the event that the updated calibration factors are substantially different than the calibration factors, controller 130 may further update the stored values of the measured features of component in database 134 based on the updated calibration factors.

This example automotated recalibration procedure is made possible by the configuration of touch probe 2, which allows touch probe 2 and component 124 to both be mounted to platform 138 simultantously. In additon, the design of touch probe 2 faciltates calibration procedures that allow imprecise positioning of touch probe 2 on platfor 138. Calibration may be repeated as often as needed without human intervention to ensure precise measurements with touch probe 112 during evlauation of component 124.

Controller 130 evaluates whether the measurements of component 124 are within specified tolerances (180). If the measurements of component 124 are not within specified tolerances, controller 130 may indicate that component 124 should be reworked (182). In examples in which mechanical arm 114 may serve as a multipurpose robotic arm with machining capabilities in addition to facilitating measurements of calibration block 2 and component 124, controller 130 may automatically rework component 124 to bring component 124 within specified tolerances. Alternatively, or in addition to automatically reworking the component 124, controller 130 may automatically store an indication that measured features of component 124 are outside a predetermined tolerance range within database 134. Controller 130 may also present the indication of the quality of the measured features of component 124 to a human operator via user interface 132 of controller 130 or via a network connection to a remote computing device. Following any rework procedure of component 124, the techniques of FIG. 4 may be repeated, optionally beginning with the calibration procedure of step 140.

The techniques described in this disclosure may be implemented, at least in part, in hardware, software, firmware, or any combination thereof. For example, various aspects of the described techniques, including controller 130 and database 134 may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples of this disclosure have been described. These and other examples are within the scope of the following claims.

What is claimed is:

1. A system comprising:
   a measurement table;
   a calibration block for calibrating a touch probe, the calibration block comprising:
   a calibration block body forming a bored hole providing a concave measurement surface;
   a magnetic base comprising one or more permanent magnets and a manual release mechanism configured to facilitate releasing the magnetic base from the measurement table; and
   a three dimensional object protruding from the calibration block body and providing a convex measurement surface, wherein the convex measurement surface provides opposing measurement contact points in at least two dimensions;

a five-axis mechanical holding arm configured to manipulate a touch probe to measure the calibration block and a component; and a computing device configured to:
send control signals to the five-axis mechanical holding arm to locate the touch probe mounted in the five-axis mechanical holding arm relative to the calibration block;
send control signals to the five-axis mechanical holding arm to measure the three dimensional object with a distal tip of the touch probe by contacting multiple points of the three dimensional object;
send control signals to the five-axis mechanical holding arm to measure the bored hole with sides of the distal tip of the touch probe by contacting multiple points of the concave measurement surface;
generate calibration factors for the touch probe by comparing the sizes of the three dimensional object and the bored hole as measured by manipulating the touch probe with the five-axis mechanical holding arm with predefined actual sizes of the three dimensional object and the bored hole;
store the calibration factors for the touch probe in a non-transitory computer readable medium;
after storing the calibration factors for the touch probe, send control signals to the five-axis mechanical holding arm to measure features of the component with the distal tip of the touch probe, wherein the calibration block and the component are both secured to the measurement table during the measurement of the calibration block and the measurement of the component;
store values of the measured features of the component in the non-transitory computer readable medium, the values being based on the calibration factors;
after storing values of the measured features of the component in the non-transitory computer readable medium, send control signals to the five-axis mechanical holding arm to again measure at least one of the three dimensional object and the bored hole with the touch probe;
compare the sizes of the at least one of the three dimensional object and the bored hole as measured by manipulating the touch probe with the five-axis mechanical holding arm with the predefined actual sizes of the at least one of the three dimensional object and the bored hole to generate updated calibration factors for the touch probe; and
in the event that the updated calibration factors are substantially different than the calibration factors, update the stored values of the measured features of the component in the non-transitory computer readable medium based on the updated calibration factors.

2. The system of claim 1,
wherein the bored hole at least approximates a cylindrical shape, and
wherein the concave measurement surface at least approximates a ring shape.

3. The system of claim 1, wherein the three dimensional object at least approximates a sphere.

4. The system of claim 1, further comprising a mounting rod protuding from the calibration block body, wherein the three dimensional object is mounted to the mounting rod.

5. The system of claim 1, wherein the convex measurement surface provides opposing measurement contact points in three dimensions to faciltate five-axis calibration of the touch probe.

6. The system of claim 1, further comprising a user interface configured to receive a user input indicating the predefined actual sizes.

7. A method of calibrating a touch probe comprising:
securing a calibration block to a measurement table using one or more permanent magnets in a magnetic base of the calibration block, wherein the magnetic base further comprises a manual release mechanism configured to facilitate releasing the magnetic base from the measurement table;
locating the touch probe relative to a calibration block, the calibration block including a calibration block body forming a bored hole providing a concave measurement surface, and a three dimensional object protruding from the calibration block body and providing a convex measurement surface, wherein the convex measurement surface provides opposing measurement contact points in at least two dimensions;
measuring the three dimensional object with a distal tip of the touch probe by manipulating the touch probe with a five-axis mechanical holding arm and contacting multiple points of the three dimensional object;
measuring the bored hole with sides of the distal tip of the touch probe by manipulating the touch probe with a five-axis mechanical holding arm and contacting multiple points of the concave measurement surface;
comparing the sizes of the three dimensional object and the bored hole as measured by manipulating the touch probe with the five-axis mechanical holding arm with predefined actual sizes of the three dimensional object and the bored hole to generate calibration factors for the touch probe;
storing the calibration factors for the touch probe in a non-transitory computer readable medium;
after storing the calibration factors for the touch probe, measuring features of the component with the distal tip of the touch probe by manipulating the touch probe with the five-axis mechanical holding arm, wherein the calibration block and the component are both secured to the measurement table during the measurement of the calibration block and the measurement of the component;
storing values of the measured features of the component in the non-transitory computer readable medium, the values being based on the calibration factors;
after storing values of the measured features of the component in the non-transitory computer readable medium, again measuring at least one of the three dimensional object and the bored hole with the touch probe by manipulating the touch probe with the five-axis mechanical holding arm;
comparing the sizes of the three dimensional object and the bored hole as measured by manipulating the touch probe with the five-axis mechanical holding arm with the predefined actual sizes of the three dimensional object and the bored hole to generate updated calibration factors for the touch probe;
storing the updated calibration factors for the touch probe in the non-transitory computer readable medium; and
in the event that the updated calibration factors are substantially different than the calibration factors, updating the stored values of the measured features of the component in the non-transitory computer readable medium based on the updated calibration factors.

8. The method of claim 7, wherein measuring the three dimensional object with the distal tip of the touch probe comprises and contacting at least six points of the three dimensional object.

9. The method of claim 8, wherein each point of the six points of the three dimensional object is at a different angular position about the three dimensional object.

10. The method of claim 7, further comprising mounting the touch probe in the five-axis mechanical holding arm.

11. The method of claim 7,
wherein the bored hole at least approximates a cylindrical shape, and
wherein the concave measurement surface at least approximates a ring shape.

12. The method of claim 7, wherein the three dimensional object at least approximates a sphere.

13. A non-transitory computer-readable data storage medium having instructions stored thereon that, when executed by one or more processors of a computing device, cause the computing device to:
send control signals to a five-axis mechanical holding arm to locate a touch probe mounted in the five-axis mechanical holding arm relative to a calibration block, wherein the calibration block includes:
a calibration block body forming a bored hole providing a concave measurement surface,
a three dimensional object protruding from the calibration block body and providing a convex measurement surface, wherein the convex measurement surface provides opposing measurement contact points in at least two dimensions, and
a magnetic base comprising a magnetic base comprising one or more permanent magnets and a manual release mechanism configured to facilitate releasing the magnetic base from the measurement table;
send control signals to the five-axis mechanical holding arm to measure the three dimensional object with a distal tip of the touch probe by contacting multiple points of the three dimensional object;
send control signals to the five-axis mechanical holding arm to measure the bored hole with sides of the distal tip of the touch probe by contacting multiple points of the concave measurement surface;
generate calibration factors for the touch probe by comparing the sizes of the three dimensional object and the bored hole as measured by manipulating the touch probe with the five-axis mechanical holding arm with predefined actual sizes of the three dimensional object and the bored hole;
store the calibration factors for the touch probe in a non-transitory computer readable medium;
after storing the calibration factors for the touch probe, send control signals to the five-axis mechanical holding arm to measure features of the component with the distal tip of the touch probe, wherein the calibration block and the component are both secured to the measurement table during the measurement of the calibration block and the measurement of the component;
store values of the measured features of the component in the non-transitory computer readable medium, the values being based on the calibration factors;
after storing values of the measured features of the component in the non-transitory computer readable medium, send control signals to the five-axis mechanical holding arm to again measure at least one of the three dimensional object and the bored hole with the touch probe;
compare the sizes of the three dimensional object and the bored hole as measured by manipulating the touch probe with the five-axis mechanical holding arm with the predefined actual sizes of the three dimensional object and the bored hole to generate updated calibration factors for the touch probe; and
in the event that the updated calibration factors are substantially different than the calibration factors, update the stored values of the measured features of the component in the non-transitory computer readable medium based on the updated calibration factors.

14. The computer-readable data storage medium of claim 13,
wherein the bored hole at least approximates a cylindrical shape, and
wherein the concave measurement surface at least approximates a ring shape.

15. The computer-readable data storage medium of claim 13, wherein the three dimensional object at least approximates a sphere.

* * * * *